United States Patent
Levitan et al.

(10) Patent No.: US 12,353,580 B2
(45) Date of Patent: Jul. 8, 2025

(54) BUILDING ANNOTATED MODELS BASED ON EYES-OFF DATA

(71) Applicant: Microsoft Technology Licensing, LLC, Redmond, WA (US)

(72) Inventors: David Benjamin Levitan, Bothell, WA (US); Robert Alexander Sim, Bellevue, WA (US); Julia S. McAnallen, Seattle, WA (US); Huseyin Atahan Inan, Redmond, WA (US); Girish Kumar, Redmond, WA (US); Xiang Yue, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 17/972,548

(22) Filed: Oct. 24, 2022

(65) Prior Publication Data

US 2024/0135015 A1 Apr. 25, 2024
US 2024/0232405 A9 Jul. 11, 2024

(51) Int. Cl.
*G06F 21/62* (2013.01)
*G06N 20/00* (2019.01)

(52) U.S. Cl.
CPC ......... *G06F 21/6218* (2013.01); *G06N 20/00* (2019.01)

(58) Field of Classification Search
CPC ............. G06F 11/3684; G06F 11/3688; G06F 21/577; G06F 8/71; G06F 8/36; G06F 11/3612; G06F 2009/45591; G06F 11/3664; G06F 8/77; G06F 11/3692; G06F 8/72; G06F 21/52; G06F 21/6218;
(Continued)

(56) References Cited

U.S. PATENT DOCUMENTS

2020/0320351 A1* 10/2020 Nikolenko ............ G06F 18/217
2020/0387635 A1* 12/2020 Lo ....................... G06F 16/116
(Continued)

FOREIGN PATENT DOCUMENTS

CN        113553624 A     10/2021
KR        102297548 B1     9/2021
WO   WO-2021111289 A1 *   6/2021  ......... G06F 21/6254

OTHER PUBLICATIONS

Buls, et al., "Generation of synthetic training data for object detection in piles", In Proceedings of Eleventh International Conference on Machine Vision, Mar. 15, 2019, 9 Pages.
(Continued)

*Primary Examiner* — Sharif E Ullah
(74) *Attorney, Agent, or Firm* — Ray Quinney & Nebeker; James Bullough

(57) ABSTRACT

Systems and methods are directed to building annotated models based on eyes-off data. Specifically, a synthetic data generation model is trained and used to further train a target model. The synthetic data generation model is trained within an eyes-off environment using an anonymity technique on confidential data. The synthetic data generation model is then used to create synthetic data that closely represents the confidential data but without any specific details that can be linked back to the confidential data. The synthetic data is then annotated and used to train the target model within an eyes-on environment. Subsequently, the target model is deployed back within the eyes-off environment to classify the confidential data.

20 Claims, 9 Drawing Sheets

(58) Field of Classification Search
CPC . H04L 63/1433; H04L 41/5054; H04L 43/50; H04L 12/40006; G06N 3/086
USPC .......... 726/26, 2, 21, 36; 713/150, 163, 181; 380/255, 264, 276
See application file for complete search history.

(56) References Cited

U.S. PATENT DOCUMENTS

| | | | | |
|---|---|---|---|---|
| 2021/0334403 | A1* | 10/2021 | Luus | G06N 3/088 |
| 2021/0357728 | A1* | 11/2021 | Kim | G06N 3/047 |
| 2021/0374279 | A1* | 12/2021 | Zheng | G06N 3/088 |
| 2022/0116199 | A1* | 4/2022 | Kim | G06N 20/00 |

OTHER PUBLICATIONS

Jordon, et al., "PATE-GAN: Generating Synthetic Data with Differential Privacy Guarantees", In Proceedings of International conference on learning representations, Sep. 27, 2018, 21 Pages.
Torkzadehmahani, et al., "DP-CGAN: Differentially Private Synthetic Data and Label Generation", In Proceedings of IEEE/CVF Conference on Computer Vision and Pattern Recognition Workshops (CVPRW), Jun. 16, 2019, pp. 98-104.
International Search Report and Written Opinion received for PCT Application No. PCT/US2023/032811, mailed on Jan. 12, 2024, 11 pages.
International Preliminary Report on Patentability (Chapter 1) received for PCT Application No. PCT/US2023/032811, May 8, 2025, 07 pages.

* cited by examiner

BUILDING ANNOTATED MODELS BASED ON EYES-OFF DATA

TECHNICAL FIELD

The subject matter disclosed herein generally relates to machine learning models. Specifically, the present disclosure addresses systems and methods that train synthetic data generation models using anonymity techniques in an eyes-off environment and utilize outputs of the synthetic data generation models in an eyes-on environment to train a target model.

BACKGROUND

Machine learning models are trained to generate an output given some data. Such models learn an expected output by "training" on data that has a known output. In some cases, human annotators provide the desired output. However, some models need to be built on data that cannot be viewed except by owners. Such data is referred to as "eyes-off" data and can include, for example, confidential data or customer data that is not owned by a system that builds the models. In these cases, human annotators cannot have direct access to the underlying data.

BRIEF DESCRIPTION OF THE DRAWINGS

Some embodiments are illustrated by way of example and not limitation in the figures of the accompanying drawings.

DETAILED DESCRIPTION

Figure 1:
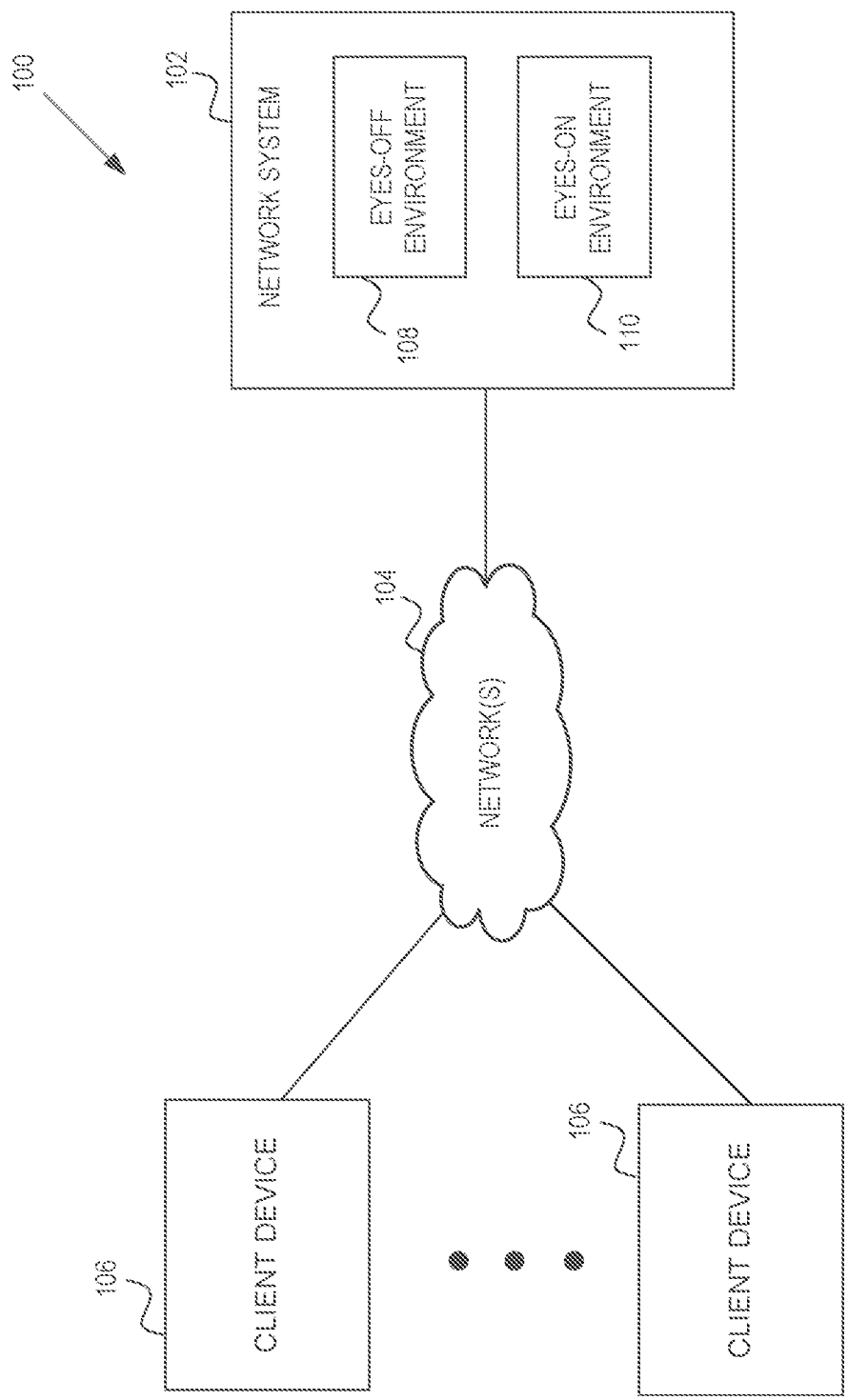
FIG. 1 is a diagram illustrating a network environment suitable for building annotated models based on eyes-off data, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Machine learning is an application that provides computer systems the ability to perform tasks, without explicitly being programmed, by making inferences based on patterns found by analyzing data. Thus, machine learning learns from existing data and make predictions about new data. Machine-learning algorithms operate by building a machine learning model from example training data in order to make data-driven predictions or decisions expressed as outputs.

There are several common modes for machine learning: supervised machine learning, unsupervised machine learning, and self-supervised machine learning. Supervised machine learning uses prior knowledge (e.g., examples that correlate inputs to outputs) to learn the relationships between the inputs and the outputs. The goal of supervised machine learning is to learn a function that, given some training data, best approximates a relationship between the training inputs and outputs so that the machine learning model can implement the same relationships when given new inputs to generate corresponding outputs. Supervised machine learning is commonly used to classify items into one of several category values (e.g., sentiments such as, positive or negative). Some examples of commonly used supervised machine learning algorithms include Logistic Regression (LR), Naïve-Bayes, Random Forest (RF), neural networks (NN), deep neural networks (DNN), matrix factorization, and Support Vector Machines (SVM).

Unsupervised machine learning is the training of a machine learning algorithm using information that is neither classified nor labeled and allowing the algorithm to act on that information without guidance. Unsupervised machine learning is useful in exploratory analysis because it can automatically identify structure in data. Some common tasks for unsupervised ML include clustering and representation learning. Some examples of commonly used unsupervised-ML algorithms are K-means clustering, principal component analysis, and autoencoders.

Self-supervised machine learning is similar to unsupervised machine learning since no labels are used. However, self-supervised machine learning attempts to solve tasks that are traditionally targeted by supervised learning without any labeling available.

Example embodiments address the technical problem of how to generate models using a data set that is representative of eyes-off confidential data (e.g., also referred to as "eyes-off data") without violating trust and privacy. To address the technical problem, example embodiments train a synthetic data generation model (e.g., a generative model) in an eyes-off environment having the confidential data wherein the training data is not labeled (e.g., unsupervised machine learning). The synthetic data generation model is then used to create synthetic data that closely represent the confidential data. The synthetic data is then annotated (e.g., labeled) and used to train a target model in an eyes-on environment. The target model can then be deployed back in the eyes-off environment. As a result, example embodiments provide a technical solution for generating, based on eyes-off data, accurate machine learning models for use in the eyes-off environment.

FIG. 1 is a diagram illustrating a network environment 100 suitable for building annotated models based on eyes-off data, in accordance with example embodiments. A network system 102 is communicatively coupled, via a network 104, to a plurality of client devices 106. In some embodiments, the network system 102 is associated with a single entity (e.g., a software-as-a-service (SaaS) provider). The network system 102 comprises an eyes-off environment 108 and an eyes-off environment 110.

The eyes-off environment 108 is an environment that contains data that is confidential, private, or proprietary (collectively referred to herein as "confidential data"). For instance, the eyes-off environment 108 may store and process data that is not owned by the network system entity (e.g., data owned by a customer of the network system entity) or user data that needs to remain confidential. In one example, the confidential data is feedback from users/patrons of a customer of the network system 102 (e.g., referred to herein as "customer feedback"). The eyes-off environment 108 will be discussed in more detail in connection with FIG. 2, FIG. 3A, and FIG. 313 below.

The eyes-on environment 110 is an environment in which users associated with the network system 102 (e.g., employee, agent) have access to (e.g., can view, can manipulate) data. In the context of example embodiments, users can access data in the eyes-on environment 110 in order to annotate or label data for machine learning. The eyes-on environment 110 will be discussed in more detail in connection with FIG. 2, FIG. 3A, and FIG. 3B below.

Each client device 106 is a device of a user of the network system 102. The client devices 106 may comprise, but are not limited to, a smartphone, tablet, laptop, multi-processor systems, microprocessor-based or programmable consumer electronics, game consoles, set-top boxes, a server, or any other communication device that can perform operations with respect to the network system 102 via the network 104. The operations can include, for example, generating or providing confidential data that is stored in the eyes-off environment 108, annotating data in the eyes-on environment 110, and viewing results of analysis performed by the network system 102.

In some cases, the client device 106 is associated with an owner of the confidential data in the eyes-off environment 108 and is used to access the confidential data or any analyzed outcomes performed in the eyes-off environment 108. For example, the owner of the confidential data can be a restaurant chain owner, the confidential data can be customer feedback/reviews of their restaurants, and the analyzed outcomes can be analysis of the customer feedback/reviews (e.g., which locations had the best servers, which food items were highly rated).

Depending on the form of the client devices 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks).

In another example, the connection to the network 104 is a Wireless Fidelity (Wi-Fi, IEEE 802.11x type) connection, a Worldwide Interoperability for Microwave Access (WiMAX) connection, or another type of wireless data connection. In some embodiments, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated In example embodiments, any of the systems, devices, or environments (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 6, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any of the components illustrated in FIG. 1 or their functions may be combined, or the functions described herein for any single component may be subdivided among multiple components. Additionally, any number of client devices 106 may be embodied within the network environment 100. While only a single network system 102 is shown, alternative embodiments contemplate having more than one network system 102 to perform the operations discussed herein (e.g., each localized to a particular region).

Figure 2:
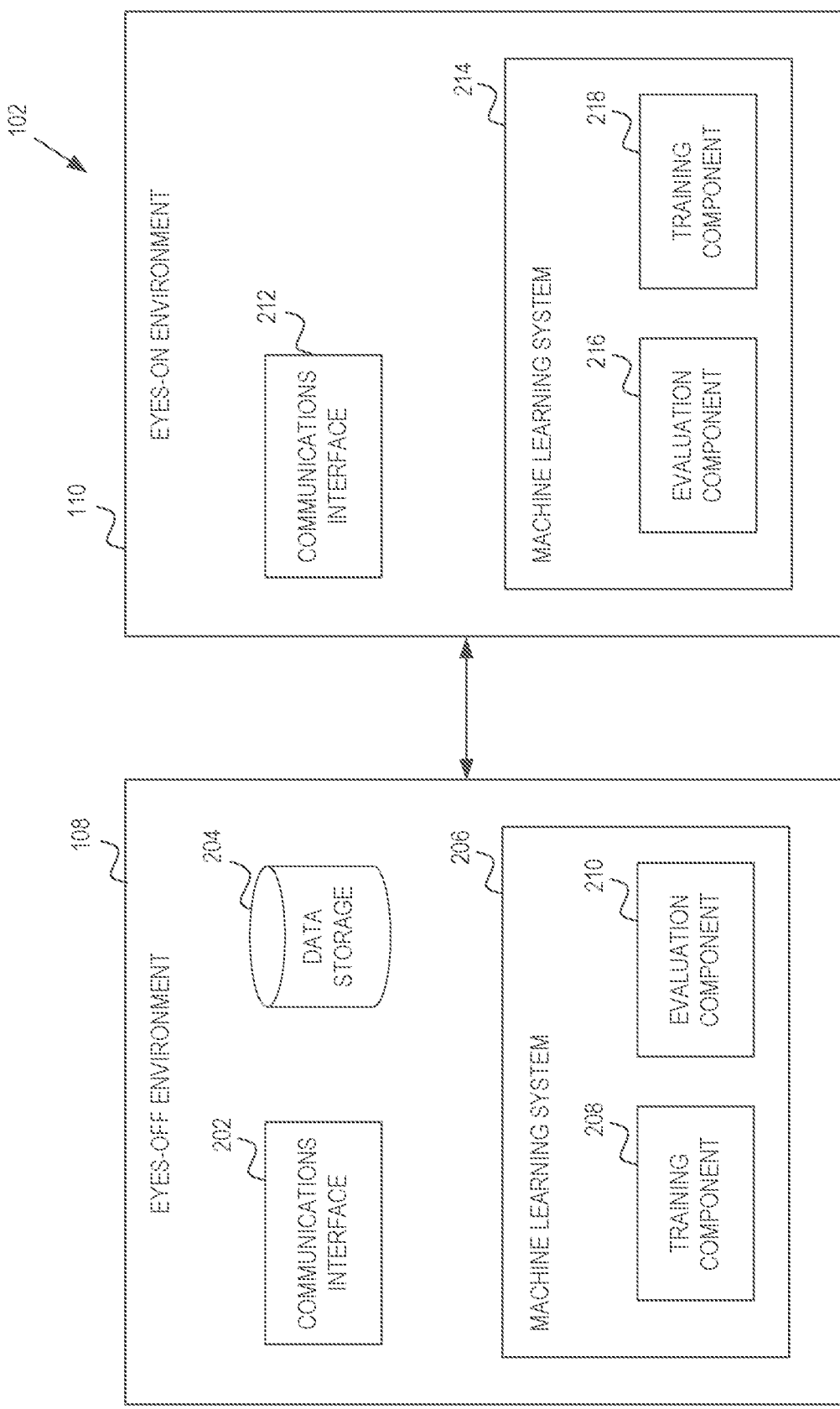
FIG. 2 is a diagram illustrating components of the network system, according to some example embodiments.

FIG. 2 is a diagram illustrating components of the network system 102, according to some example embodiments. The network system 102 comprises the eyes-off environment 108 and the eyes-off environment 110 communicative coupled together (e.g., via a network).

The eyes-off environment 108 is an environment that receives, stores, and analyzes data that is confidential, private, or proprietary. In one example, the data comprises customer data or customer feedback. However, any type of confidential data can be stored and analyzed within the eyes-off environment 108.

In example embodiments, the eyes-off environment 108 comprises a communication interface 202, a data storage 204, and a machine learning system 206. The communication interface 202 is configured to exchange data with other components. For instance, the communication interface 202 receives data from the client device 106 (e.g., confidential data) and stores the data to the data storage 204. The communication interface 202 also provides access to an owner of the data to view, manipulate, or perform other operations with the data. In some embodiments, the communication interface 202 also exports (or transmits) a synthetic data generation model (or synthetic data) to the eyes-on environment 110 and imports (or receives) a target model from the eyes-on environment 110.

The machine learning system 206 is configured to generate one or more machine learning models and to use machine learning models to analyze the confidential data stored in the data storage 204. To perform these operations, the machine learning system 206 comprises a training component 208 and an evaluation component 210. The training component 208 is configured to train one or more machine learning models within the eyes-off environment 108. In some embodiments, the training component 208 performs unsupervised learning using an anonymity technique to train a synthetic data generation model using the confidential data in the data storage 204. In some embodiments, the training is "self supervised" whereby a target label is a next token in the text. That is, the synthetic data generation model is trained in a way that makes the model itself anonymous using the real data from the data storage 204. In one embodiment, the training component 208 uses differential privacy. In other embodiments, the training component 208 uses K user anonymity (e.g., at least K users produce the same data point) or personally identifiable information (PII) scrubbing (e.g., scrub out names but not details).

In some embodiments, the training component 208 also trains a final model using data generated by a target model that has been trained with annotated, synthetic data in the eyes-on environment. In these embodiments, the target model annotates/classifies (e.g., categorizes or labels) the confidential data in the data storage 204. The annotated confidential data is then used to train the final model, as will be discussed in more detail below.

The evaluation component 210 is configured to evaluate the confidential data using one or more machine learning models. In example embodiments, the evaluation component 210 applies the confidential data from the data storage 204 to the target model to obtained classified or annotated results. For example, if the target model is trained to identify positive, negative, and neutral feedback, then the data can be classified as positive, negative, or neutral. The classified confidential data can thus be used to produce analytics or dashboards about the confidential data. For example, conclusions can be drawn about whether an overall sentiment of the data is positive, neutral, or negative without ever revealing the confidential data.

The eyes-on environment 110 is an environment in which users associated with the network system 102 can access (e.g., can view, can manipulate) data. These users do not have access rights to view the confidential data in the eyes-off environment 108 but can view synthetic data that represents the confidential data without any identifiable information. In the context of example embodiments, the users can access synthetic data in the eyes-on environment 110 in order to annotate or label the synthetic data for machine learning, as will be discussed in more detail below.

In example embodiments, the eyes-on environment 110 comprises a communication interface 212 and a machine learning system 214. The communication interface 212 is configured to exchange data with other components. For instance, the communication interface 212 imports (or receives) the synthetic data generation model generated in the eyes-off environment 108 and exports (or transmits) the target model to the eyes-off environment 108. In some embodiments, the communication interface 212 also provides access to human annotators that annotate synthetic data generated by the synthetic data generation model.

The machine learning system 214 is configured to generate the target model using synthetic data that is annotated or labeled. To perform these operations, the machine learning system 214 comprises an evaluation component 216 and a training component 218. In some embodiments, the evaluation component 216 is configured to run the synthetic data generation model to obtain synthetic data. The synthetic data is an equivalent of the underlying confidential data from the eyes-off environment 108 that is no longer considered to be violating privacy because it is just a general idea of what the confidential data is without any specifics.

The synthetic data is then annotated or labeled so that it can be used to train the target model. In some embodiments, the synthetic data can be reviewed and annotated by a human user (e.g., via a client device). In some embodiments, the synthetic data can be reviewed and annotated by a machine (e.g., a machine learning model).

The training component 218 is configured to train the target model using the annotated, synthetic data. In example embodiments, the training component 218 performs supervised learning using the annotated synthetic data, as will be discussed in more detail below. The target model is then exported to the eyes-off environment 108 for use in analyzing the confidential data within the eyes-off environment 108.

While the embodiment shown in FIG. 2 exports the synthetic data generation model to the eyes-on environment 110 for running by the evaluation component 216, alternative embodiments may run the synthetic data generation model within the eyes-off environment 108. The synthetic data is then exported to the eyes-on environment 110 where it can be annotated and used to train the target model.

Figure 3A:
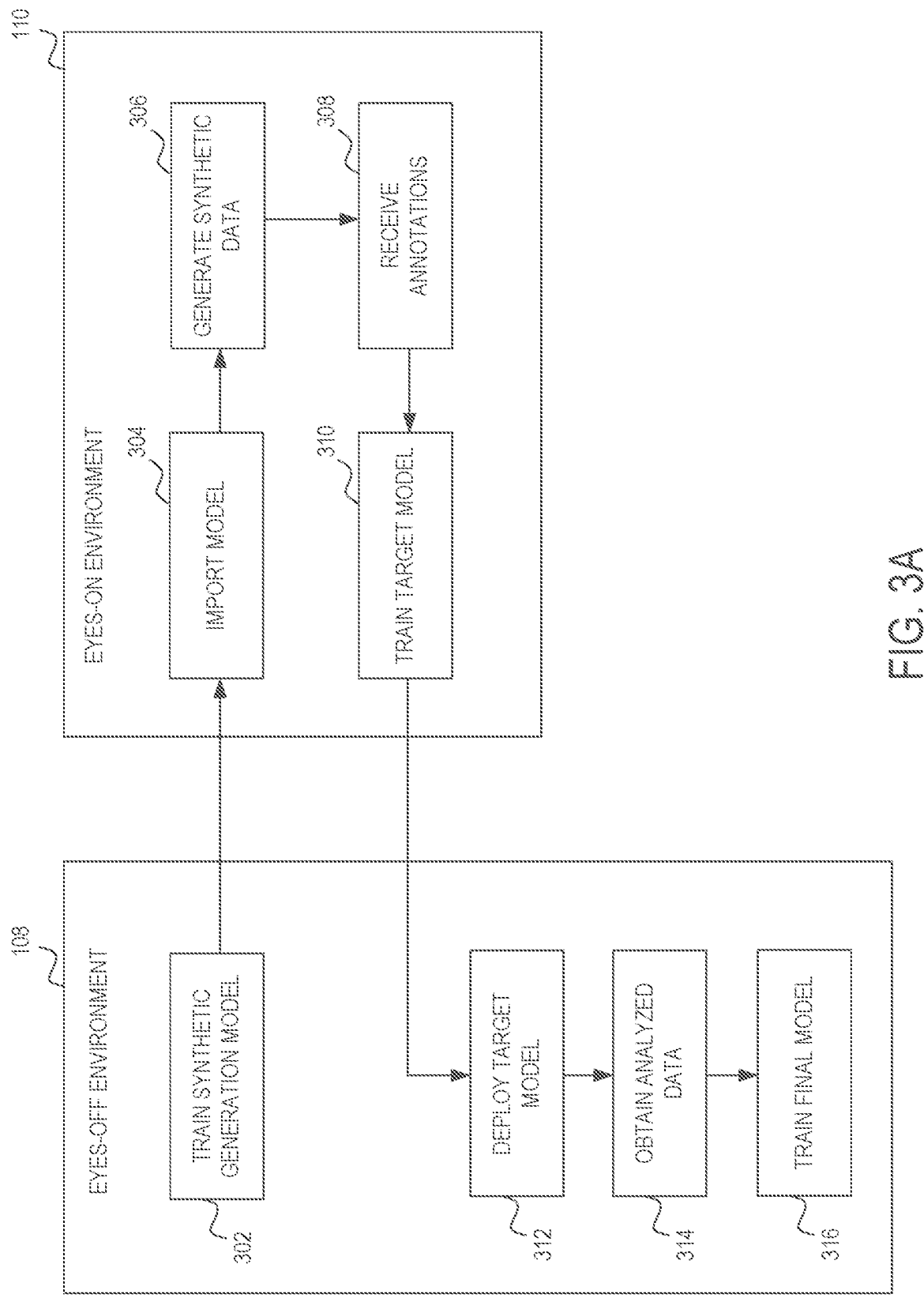
FIG. 3A is a diagram illustrating operations performed within the network system, according to some example embodiments.

Referring now to FIG. 3A, a diagram illustrating operations performed within the different environments of the network system 102, according to some example embodiments, is shown. In operation 302, the training component 208 of the machine learning system 206 trains the synthetic data generation model in the eyes-off environment 108. The training incorporates an anonymity technique. In one embodiment, the anonymity technique is differential privacy. The synthetic data generation model is trained to replicate the confidential data but in a way that incorporates privacy into the model training process. Although the synthetic data generation model learns a rough structure or general concept of what is in the confidential data, the synthetic data generation model does not know the specifics. Instead, the synthetic data generation model is trained to encode patterns such as, for example, common phrasing, sentiment, and/or structure of the data (e.g., how users provide feedback). For instance, with user feedback data, the synthetic data generation model is trained to create synthetic versions of the user feedback that cannot be linked back to any single user feedback. Essentially, the training component 208 trains the synthetic data generation model such that the source data (e.g., the confidential data) has been sufficiently anonymized. Alternative embodiments may use other anonymity techniques such as, for example, K user anonymity or personally identifiable information (PII) scrubbing.

After the synthetic data generation model is generated, the synthetic data generation model is exported to the eyes-on environment 110 in accordance with some embodiments. FIG. 3A shows the synthetic data generation model imported to the eyes-on environment 110 in operation 304.

In operation 306, synthetic data is generated in the eyes-on environment 110. In example embodiments, the evaluation component 216 runs the synthetic data generation model to obtain the synthetic data that is the equivalent of the underlying confidential data. The synthetic data provides a general idea of what the confidential data is but without any specifics that can be linked back to the actual confidential data.

Annotated synthetic data is then received in operation 308. In some embodiments, the annotating or labeling is performed by a human user. For instance, the human user accesses the synthetic data via their client device and evaluates (e.g., classifies or labels) the synthetic data. In some embodiments, a machine annotates the synthetic data. In these embodiments, the machine is trained to perform the annotating (e.g., via machine learning). Further still, a combination of human and machine can perform the annotating.

The annotated synthetic data is then used to train the target model in operation 310. In example embodiments, the training component 218 takes the annotated synthetic data and trains the target model. As a result, the target model is trained to classify the confidential data in the eyes-off environment 108 without having access to the specific confidential data as training data.

The target model is then deployed within the eyes-off environment 108 in operation 312. For example, the target model is exported out of the eyes-on environment 110 and imported into the eyes-off environment 108. The evaluation component 210 then deploys the target model using the confidential data in the eyes-off environment 108.

In operation 314, analyzed data is obtained as the output of the target model. In some embodiments, the target model categorizes (e.g., annotates or labels) the confidential data. The analyzed data can then be stored back to the data storage 204 or used to generate analytic results or dashboards. The owner of the confidential data can access and view the analyzed data, analytic results, or dashboards. In the customer feedback scenario, the output of the target model can be, for example, an indication of whether the customer feedback is positive, negative, or neutral.

As an extension, in operation 316, the analyzed data is used to train a final model within the eyes-off environment 108. Because the analyzed data is the actual confidential data now labeled/annotated, the final model will likely be a more accurately trained model. The final model can then be used instead of the target model to analyze current and future confidential data. Operation 316 is optional in example embodiments.

Figure 3B:
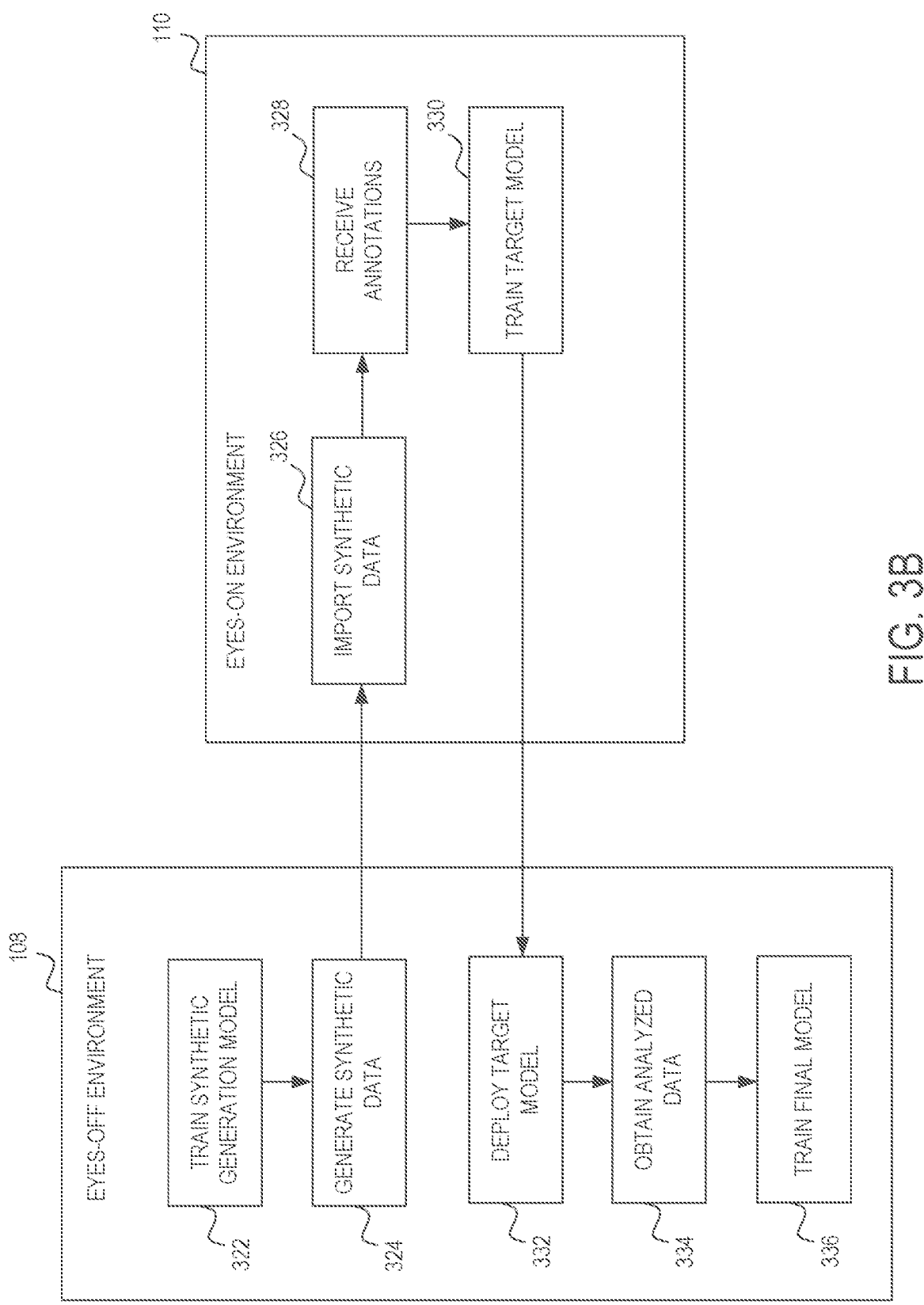
FIG. 3B is a diagram illustrating operations performed within the network system, according to alternative example embodiments.

FIG. 3B is a diagram illustrating operations performed within the network system 102, according to alternative example embodiments. The embodiment shown in FIG. 3B differs from the embodiment shown in FIG. 3A in that the synthetic data generation model does not get exported to the eyes-on environment 110. Thus, in operation 322, the training component 208 of the machine learning system 206 trains the synthetic data generation model using an anonymity technique in the eyes-off environment 108. The synthetic data generation model is trained to replicate the confidential data by learning a rough structure or general concept of what is in the confidential data.

In operation 324, the synthetic data is generated in the eyes-off environment 108. In example embodiments, the evaluation component 210 runs the synthetic data generation model to obtain synthetic data that is the equivalent of the underlying confidential data without any specifics (e.g., specific details) that can be linked back to the actual confidential data.

After the synthetic data is generated, the synthetic data is exported to the eyes-on environment 110. FIG. 3B shows the synthetic data imported to the eyes-on environment 110 in operation 326.

Annotated synthetic data is then received in operation 328. In some embodiments, the annotating or labeling is performed by a human user. In some embodiments, a machine annotates the synthetic data. Further still, a combination of human and machine can perform the annotating.

The annotated synthetic data is then used to train the target model in operation 330. In example embodiments, the training component 218 takes the annotated synthetic data and trains the target model. As a result, the target model is trained to classify the confidential data in the eyes-off environment 108 without having access to the confidential data as training data.

The target model is then deployed within the eyes-off environment 108 in operation 332. Thus, the target model is exported out of the eyes-on environment 110 and imported into the eyes-off environment 108. The evaluation component 210 then deploys the target model using the confidential data in the eyes-off environment 108.

In operation 334, analyzed data is obtained as the output of the target model. In some embodiments, the target model categorizes (e.g., annotates or labels) the confidential data. The analyzed data can then be stored back to the data storage 204 or used to generate analytic results or dashboards.

In optional operation 336, the analyzed data is used to train a final model. Because the analyzed data is the actual confidential data, the final model will be a more accurately trained model. The final model can then be used instead of the target model to analyze current and future confidential data.

Figure 4A:
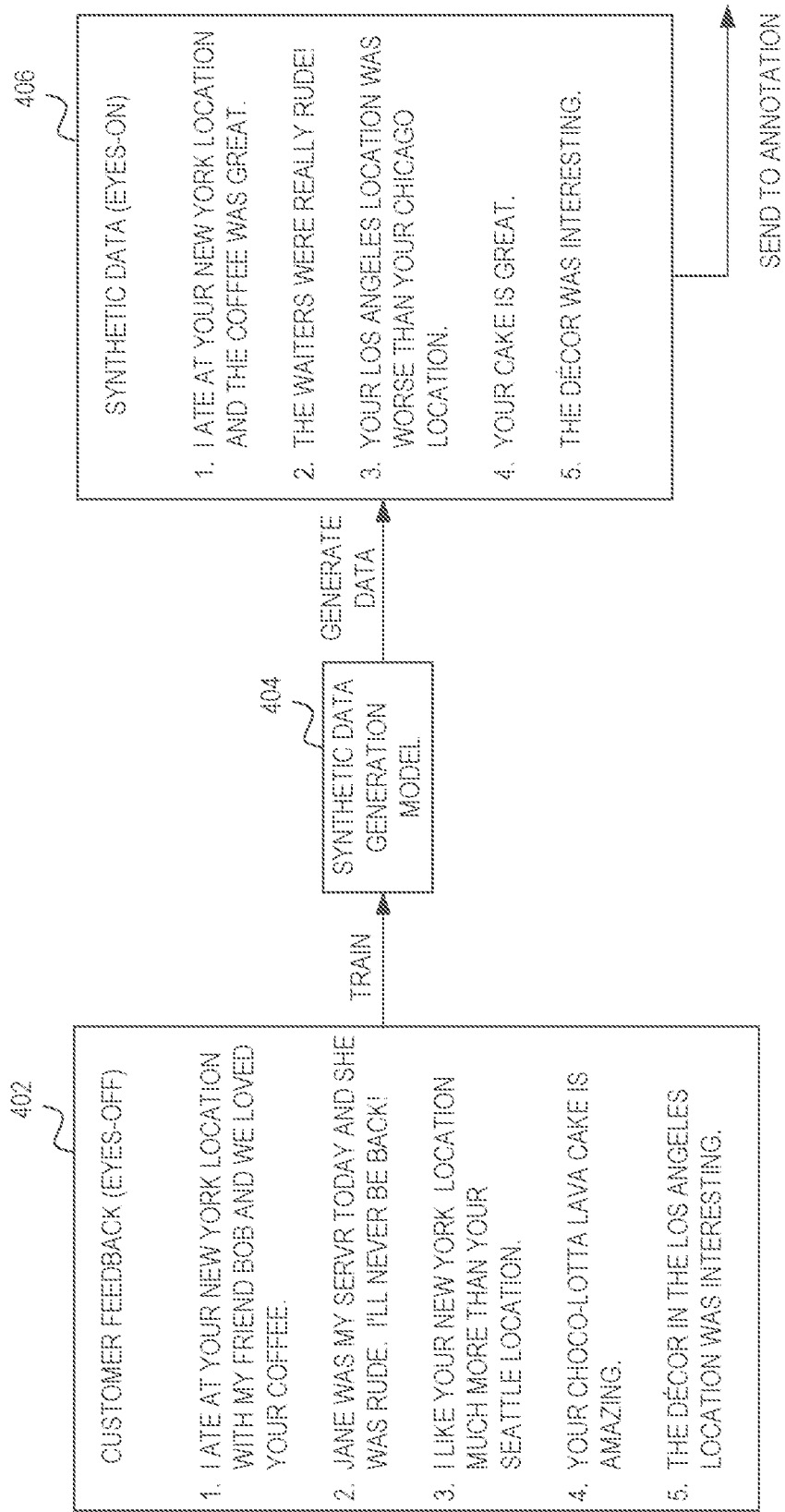
FIG. 4A-FIG. 4C provides an example use case utilizing example embodiments.
Figure 4B:
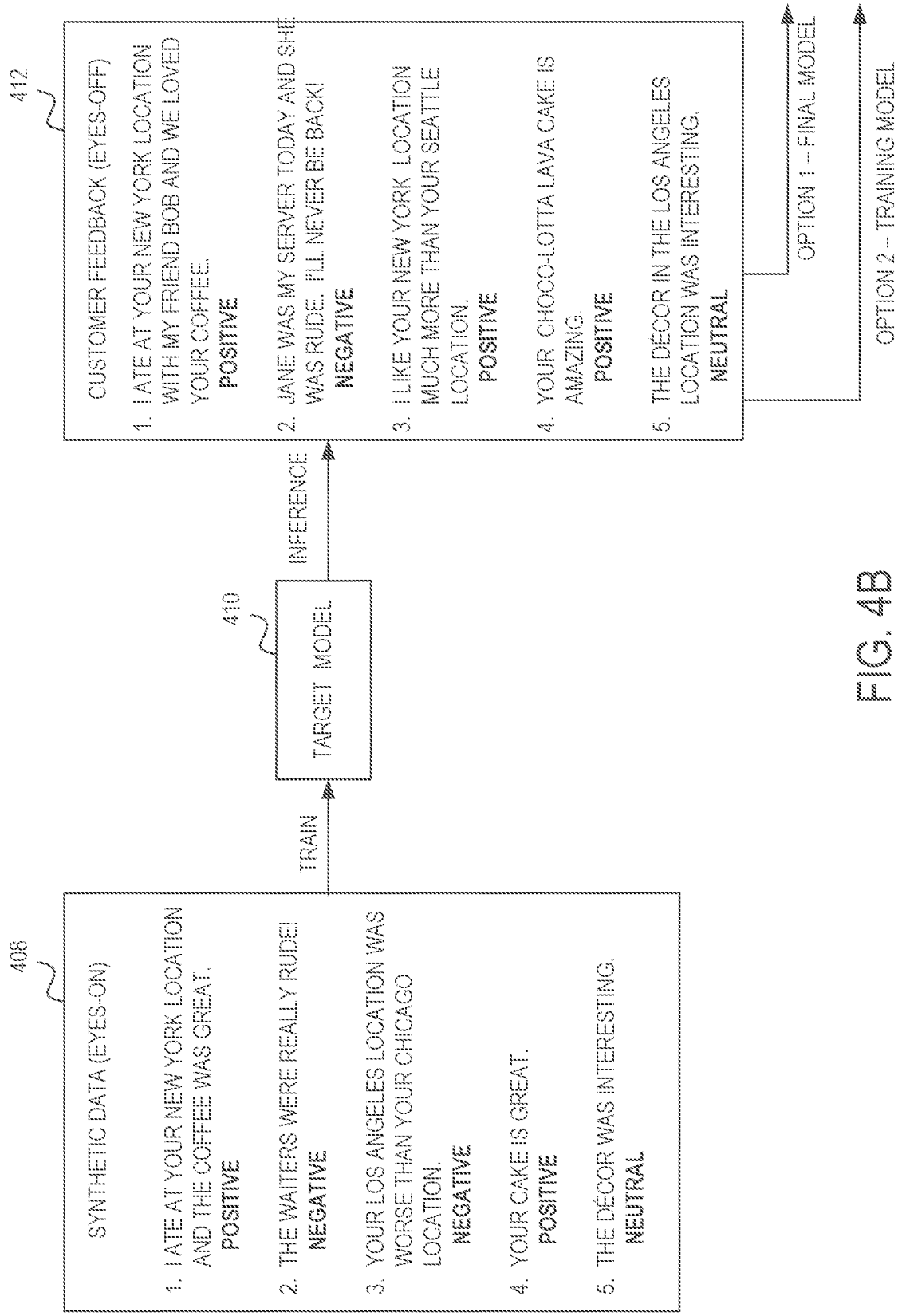
Figure 4C:
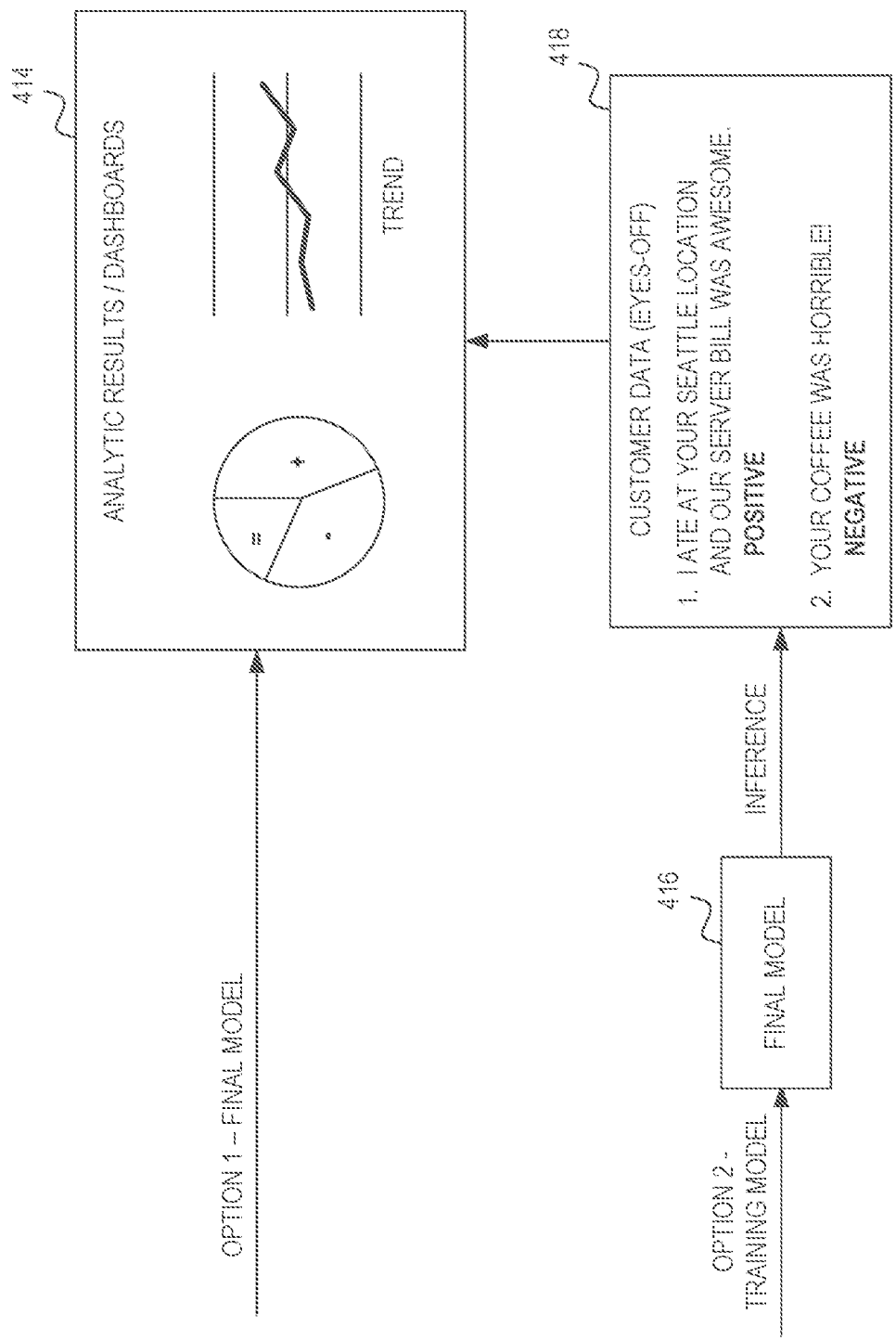

FIG. 4A-FIG. 4C provides an example use case utilizing example embodiments. The example use case assumes a data owner that is a restaurant chain and the confidential data includes feedback from their customers (referred to as "customer feedback"). Here, the data owner is using functions/operations of the network system 102 as a service. Thus, the eyes-on environment 110 is controlled by an entity that is different from the data owner. As such, any data in the eyes-off environment 108 should maintain confidential and not accessible by users in the eyes-on environment 110.

In the use case, the data owner (e.g., a customer/client of the entity controlling the network system 102) has their customer feedback 402 stored in the data store 204. This is data owner content and as such is eyes-off (confidential) content. As shown in FIG. 4A, the customer feedback 402 comprises statements that includes identifying information. For example, names of individuals (e.g., friend Bob, server Jane) and names of specific/proprietary products (e.g., Choco-lotta lava cake) are indicated.

The training component 208 in the eyes-off environment 108 trains a synthetic data generation model 404 using the customer feedback 402. In example embodiments, the training component 208 trains the synthetic data generation model 404 to learn to generate data as similar as possible to the original data (e.g., the customer feedback 402). During the training, a privacy preserving technique is incorporated, such as differential privacy, to ensure that unique user data is removed.

Subsequently, the evaluation component 210 or 218 runs the synthetic data generation model 404 to generate synthetic data 406. As shown in FIG. 4A, the synthetic data 406 comprises data that is an equivalent of the underlying data from the eyes-off environment 108 that is no longer considered to be violating privacy because it is just a general idea of what the confidential data (e.g., customer feedback 402) is without any specific details. The evaluation component 210 or 218 "asks" the synthetic data generation model 404 to produce as much synthetic data 406 as needed. In some cases, private details that only appear a few times (e.g., names, proprietary product names) are not learned by the synthetic data generation model 404 and hence not included in the synthetic data. For example, waiter names, customer names, and names of products (e.g., Choco-lotta lava cake). The synthetic data 406 is now considered anonymized (e.g., not confidential or customer data) and safe to export to (or use in) the eyes-on environment 110 without violating customer privacy. While the example of FIG. 4 shows a one-to-one correspondence between the synthetic data and the original, confidential data, example embodiments may generate synthetic data that cannot be directly matched to the original, confidential data. That is, the synthetic data does not have a one-to-one correspondence with the original, confidential data.

The synthetic data 406 is then annotated. The annotation may be performed by a human user or a machine in the eyes-on environment 110. Referring now to FIG. 4B, the annotated synthetic data 408 is shown being annotated with a positive, negative, or neutral label. It is noted that other labels may be used. The labels used will be dependent on the type of data being analyzed and desired outputs.

The annotated synthetic data 408 is then used to train a target model 410. In the present embodiment, the target model 410 is trained as a sentiment classifier or sentiment model. Alternative embodiments may contemplate training the target model 410 for other types of classification.

The target model 410 is then used within the eyes-off environment 108 to infer sentiment of the confidential data inside the eyes-off environment 108. Since the target model 410 was trained on data very similar to the original confidential data, it will have a high accuracy. As shown in FIG. 4B, the analyzed customer feedback 412 is now labeled with a positive, negative, or neutral label.

In some embodiments, the target model 410 is the final model used to classify the confidential data (option 1). As shown in FIG. 4C, an output of the target model 410 can be used to provide analytic results. For example, a dashboard 414 showing a breakdown of sentiment between positive (+), negative (−), and neutral (=) can be shown (e.g., as a pie chart). In another example, the output can be used to illustrate a trend in sentiment. Since the analytic results are aggregated numbers without customer identifying information, it can be shown (or be accessible) outside of the eyes-off environment 108, in accordance with some embodiments.

In some embodiments, the target model 410 is a training model used to train a final model 416 within the eyes-off environment 108 (option 2). In the present example, the final model 416 is a final sentiment model. As such, the results from the target model 410 are used to make inferences on the real confidential data inside the eyes-off environment 108. The inferences on the real confidential data are then used to train the final model 416 inside the eyes-off environment 108.

The final model 416 that is trained on the real confidential data is then used to analyze the current and future confidential data in the eyes-off environment 108 and generate analyzed customer data 418 that is labeled with the corresponding sentiment (e.g., positive, negative, neutral). The analyzed data 418 can then be used to provide analytics results or the dashboard(s) 414.

Figure 5:
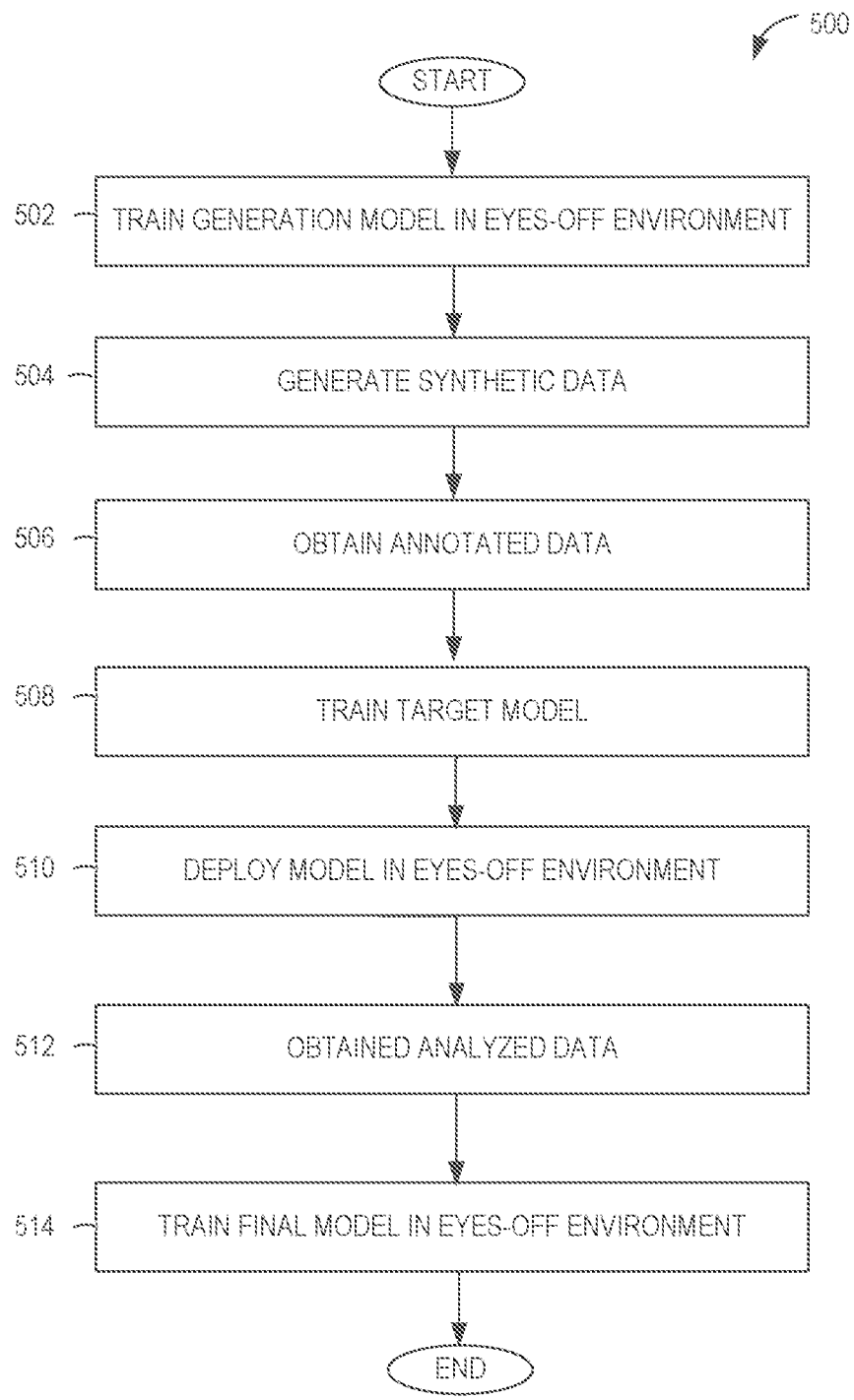
FIG. 5 is a flowchart illustrating operations of a method for building annotated models based on eyes-off data, according to some example embodiments.

FIG. 5 is a flowchart illustrating operations of a method 500 for utilizing models trained using anonymity techniques, according to some example embodiments. Operations in the method 500 may be performed by the network system 102 in the network environment 100 described above with respect to FIG. 1 and FIG. 2. Accordingly, the method 500 is described by way of example with reference to components in the network system 102. However, it shall be appreciated that at least some of the operations of the method 500 may be deployed on various other hardware configurations or be performed by similar components residing elsewhere in the network environment 100. Therefore, the method 500 is not intended to be limited to these components.

In operation 502, the training component 208 of the machine learning system 206 trains the synthetic data generation model in the eyes-off environment 108 by incorporating an anonymity technique. The synthetic data generation model is trained to recognize patterns such as, for example, common phrasing, sentiment, and structure of the data. As a result, the synthetic data generation model is trained to replicate the confidential data but in a way that incorporates privacy into the model training process. In various embodiments, the anonymity technique can be, for example, differential privacy, K user anonymity, or personally identifiable information (PII) scrubbing.

In operation 504, synthetic data is generated by the synthetic data generation model. In some embodiments, the synthetic data generation model is exported to the eyes-on environment 110 and the evaluation component 216 runs the synthetic data generation model to generate the synthetic data. In some embodiments, the evaluation component 210 in the eyes-off environment 108 runs the synthetic data generation model to generate the synthetic data. In these embodiments, the generated synthetic data is then exported to the eyes-on environment 110.

In operation 506, annotated synthetic data is obtained. In some embodiments, the annotating or labeling is performed by a human user. For instance, the human user accesses the synthetic data via their client device and evaluate the synthetic data. In some embodiments, a machine annotates the synthetic data. In these embodiments, machine learning is used to train the machine to perform the annotating.

In operation 508, the annotated synthetic data is then used to train the target model. In example embodiments, the training component 218 takes the annotated synthetic data as input and trains the target model in the eyes-on environment 110.

In operation 510, the target model is deployed within the eyes-off environment 108. In example embodiments, the target model is exported out of the eyes-on environment 110 and imported into the eyes-off environment 108. The evaluation component 210 then deploys the target model using the confidential data in the eyes-off environment 108.

In operation 512, analyzed data (e.g., an output) of the deployed target model is obtained. In example embodiment, the analyzed data comprises the confidential data labeled or categorized. For example, the analyzed data may be categorized by sentiment. In some embodiments, the method 500 ends here and the analyzed data is output, for example, as analytic results or a dashboard.

In operation 514, the analyzed data is used to train a final model within the eyes-off environment. Because the analyzed data is the actual confidential data, the final model will likely be a more accurately trained model. The final model can then be used instead of the target model to analyze (e.g., categorize) current and future confidential data. Operation 514 is optional, in accordance with some embodiments.

As new confidential data is received by the eyes-off environment 108, the method 500 can be repeated to retrain and improve the various machine-learning models. Thus, the synthetic data generation model, the target model, and the final model can be retrained based on the new confidential data. The retraining of the various machine-learning models may result in more accurate and up-to-date models.

Figure 6:
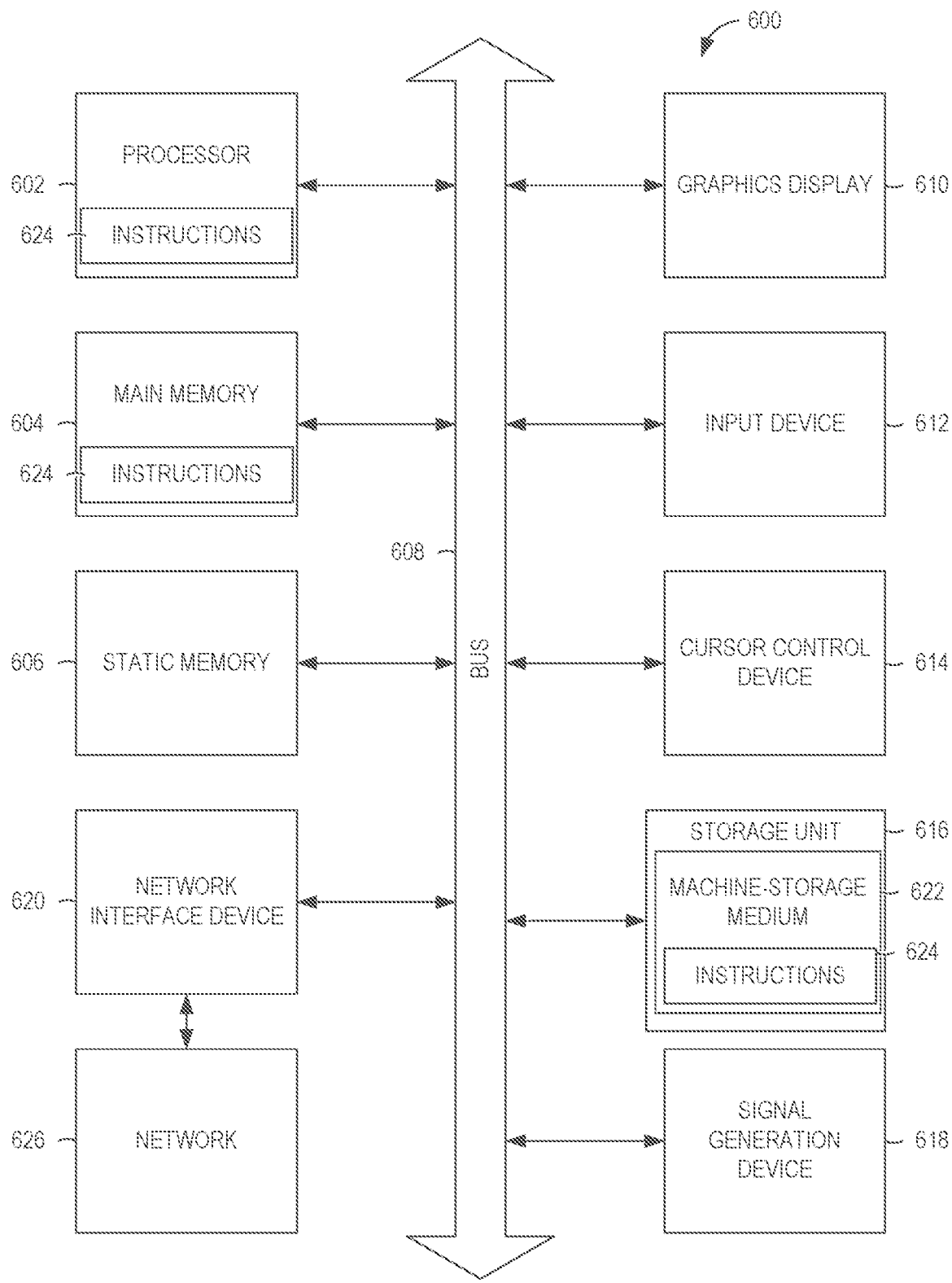
FIG. 6 is a block diagram illustrating components of a machine, according to some example embodiments, able to read instructions from a machine-storage medium and perform any one or more of the methodologies discussed herein.

FIG. 6 illustrates components of a machine 600, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIG. 3A, FIG. 3B, and FIG. 5. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-storage media (e.g., tangible and non-transitory machine-storage media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (e.g., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks, and CD-ROM and DVD-ROM disks. The terms machine-storage medium or media, computer-storage medium or media, and device-storage medium or media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Examples

Example 1 is a method for building annotated models based on eyes-off data. The method comprises accessing a synthetic data generation model, the synthetic data generation model being machine-trained using an anonymity technique on confidential data within an eyes-off environment; generating synthetic data using the synthetic data generation model, the synthetic data comprising data that is an equivalent of the confidential data without any specific details that can be linked back to the confidential data, machine-training a target model by inputting annotated versions of the synthetic data, the target model trained to classify the confidential data, and deploying the target model within the eyes-off environment to classify the confidential data.

In example 2, the subject matter of example 1 can optionally include wherein the accessing the synthetic data generation model comprises importing the synthetic data generation model from the eyes-off environment into an eyes-on environment; and the generating the synthetic data using the synthetic data generation model occurs in the eyes-on environment.

In example 3, the subject matter of any of examples 1-2 can optionally include receiving annotations of the synthetic data prior to the training of the target model.

In example 4, the subject matter of any of examples 1-3 can optionally include training a final model within the eyes-off environment based on the classified confidential data generated by the target model; and deploying the final model within the eyes-off environment.

In example 5, the subject matter of any of examples 1-4 can optionally include machine-training the synthetic data generation model in the eyes-off environment using the anonymity technique.

In example 6, the subject matter of any of examples 1-5 can optionally include wherein the anonymity technique used to machine-train the synthetic data generation model comprises differential privacy.

In example 7, the subject matter of any of examples 1-6 can optionally include wherein the anonymity technique used to machine-train the synthetic data generation model comprises K user anonymity.

In example 8, the subject matter of any of examples 1-7 can optionally include wherein the anonymity technique used to machine-train the synthetic data generation model comprises personally identifiable information scrubbing.

In example 9, the subject matter of any of examples 1-8 can optionally include based on updated confidential data in the eyes-off environment, retraining the synthetic data generation model.

In example 10, the subject matter of any of examples 1-9 can optionally include generating new synthetic data using the retrained synthetic data generation model; and retraining the target model.

Example 11 is a system for building annotated models based on eyes-off data. The system comprises one or more hardware processors and a memory storing instructions that, when executed by the one or more hardware processors, cause the one or more hardware processors to perform operations comprising accessing a synthetic data generation model, the synthetic data generation model being machine-trained using an anonymity technique on confidential data within an eyes-off environment; generating synthetic data using the synthetic data generation model, the synthetic data comprising data that is an equivalent of the confidential data without any specific details that can be linked back to the confidential data; machine-training a target model by inputting annotated versions of the synthetic data, the target model trained to classify the confidential data; and deploying the target model within the eyes-off environment to classify the confidential data.

In example 12, the subject matter of example 11 can optionally include wherein the accessing the synthetic data generation model comprises importing the synthetic data generation model from the eyes-off environment into an eyes-on environment; and the generating the synthetic data using the synthetic data generation model occurs in the eyes-on environment.

In example 13, the subject matter of any of examples 11-12 can optionally include wherein the operations further comprise receiving annotations of the synthetic data prior to the training of the target model.

In example 14, the subject matter of any of examples 11-13 can optionally include wherein the operations further comprise training a final model within the eyes-off environment based on the classified confidential data generated by the target model; and deploying the final model within the eyes-off environment.

In example 15, the subject matter of any of examples 11-14 can optionally include wherein the operations further comprise machine-training the synthetic data generation model in the eyes-off environment using the anonymity technique.

In example 16, the subject matter of any of examples 1-15 can optionally include wherein the operations further comprise based on updated confidential data in the eyes-off environment, retraining the synthetic data generation model.

In example 17, the subject matter of any of examples 11-16 can optionally include wherein the operations further comprise generating new synthetic data using the retrained synthetic data generation model; and retraining the target model.

Example 18 is a storage medium comprising instructions which, when executed by one or more hardware processors of a machine, cause the machine to perform operations for training and using a synthetic data generation model to train a classifying target model. The operations comprise accessing a synthetic data generation model, the synthetic data generation model being machine-trained using an anonymity technique on confidential data within an eyes-off environment; generating synthetic data using the synthetic data generation model, the synthetic data comprising data that is an equivalent of the confidential data without any specific details that can be linked back to the confidential data, machine-training a target model by inputting annotated versions of the synthetic data, the target model trained to classify the confidential data; and deploying the target model within the eyes-off environment to classify the confidential data.

In example 19, the subject matter of example 18 can optionally include wherein the accessing the synthetic data generation model comprises importing the synthetic data generation model from the eyes-off environment into an eyes-on environment; and the generating the synthetic data using the synthetic data generation model occurs in the eyes-on environment.

In example 20, the subject matter of any of examples 18-19 can optionally include wherein the operations further comprise training a final model within the eyes-off environment based on the classified confidential data generated by the target model, and deploying the final model within the eyes-off environment.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   importing, by a first environment in which users do not have access rights to confidential information in a second environment, a synthetic data generation model, the synthetic data generation model being machine-trained using an anonymity technique on confidential data received and stored within the second environment that comprises the confidential information;
   generating synthetic data using the synthetic data generation model, the synthetic data comprising data that is an equivalent of the confidential data without any specific details that can be linked back to the confidential data;
   machine-training, in the first environment, a target model using annotated versions of the synthetic data as training data, the target model trained to classify the confidential data in the second environment;
   exporting, by a component of the first environment, the target model back to the second environment; and
   causing deployment of the target model within the second environment to classify the confidential data.

2. The method of claim 1, wherein the generating the synthetic data using the synthetic data generation model occurs in the first eyes on environment.

3. The method of claim 1, further comprising:
   receiving annotations of the synthetic data prior to the training of the target model.

4. The method of claim 1, further comprising:
   training a final model within the second environment based on the classified confidential data generated by the target model; and
   deploying the final model within the second environment.

5. The method of claim 1, further comprising:
   machine-training the synthetic data generation model in the second environment using the anonymity technique.

6. The method of claim 5, wherein the anonymity technique used to machine-train the synthetic data generation model comprises differential privacy.

7. The method of claim 5, wherein the anonymity technique used to machine-train the synthetic data generation model comprises K user anonymity.

8. The method of claim 5, wherein the anonymity technique used to machine-train the synthetic data generation model comprises personally identifiable information scrubbing.

9. The method of claim 1, further comprising:
based on updated confidential data in the second environment, retraining the synthetic data generation model.

10. The method of claim 9, further comprising:
generating new synthetic data using the retrained synthetic data generation model; and
retraining the target model.

11. A system comprising:
one or more hardware processors; and
a memory storing instructions that, when executed by the one or more hardware processors, cause the one or more hardware processors to perform operations comprising:
importing, by a first environment in which users do not have access rights to confidential information in a second environment, a synthetic data generation model, the synthetic data generation model being machine-trained using an anonymity technique on confidential data received and stored within the second environment that comprises the confidential information;
generating synthetic data using the synthetic data generation model, the synthetic data comprising data that is an equivalent of the confidential data without any specific details that can be linked back to the confidential data;
machine-training, in the first environment, a target model using annotated versions of the synthetic data as training data, the target model trained to classify the confidential data in the second environment; and
causing deployment of the target model within the second environment to classify the confidential data.

12. The system of claim 11, wherein the generating the synthetic data using the synthetic data generation model occurs in the first environment.

13. The system of claim 11, wherein the operations further comprise:
receiving annotations of the synthetic data prior to the training of the target model.

14. The system of claim 11, wherein the operations further comprise:
training a final model within the second environment based on the classified confidential data generated by the target model; and
deploying the final model within the second environment.

15. The system of claim 11, wherein the operations further comprise:
machine-training the synthetic data generation model in the second environment using the anonymity technique.

16. The system of claim 11, wherein the operations further comprise:
based on updated confidential data in the second environment, retraining the synthetic data generation model.

17. The system of claim 16, wherein the operations further comprise:
generating new synthetic data using the retrained synthetic data generation model; and
retraining the target model.

18. A machine-storage medium comprising instructions which, when executed by one or more hardware processors of a machine, cause the machine to perform operations comprising:
importing, by a first environment in which users do not have access rights to confidential information in a second environment, a synthetic data generation model, the synthetic data generation model being machine-trained using an anonymity technique on confidential data received and stored within the second environment that comprises the confidential information;
generating synthetic data using the synthetic data generation model, the synthetic data comprising data that is an equivalent of the confidential data without any specific details that can be linked back to the confidential data;
machine-training, in the first environment, a target model using annotated versions of the synthetic data as training data, the target model trained to classify the confidential data in the second environment;
exporting, by a component of the first environment, the target model back to the second environment; and
causing deployment of the target model within the second environment to classify the confidential data.

19. The storage medium of claim 18, wherein the generating the synthetic data using the synthetic data generation model occurs in the first environment.

20. The storage medium of claim 18, wherein the operations further comprise:
training a final model within the second environment based on the classified confidential data generated by the target model; and
deploying the final model within the second environment.

* * * * *